United States Patent
Ciudad et al.

(10) Patent No.: US 7,530,065 B1
(45) Date of Patent: May 5, 2009

(54) MECHANISM FOR DETERMINING APPLICABILITY OF SOFTWARE PACKAGES FOR INSTALLATION

(75) Inventors: Jean-Pierre Ciudad, San Francisco, CA (US); Gregory Novick, Santa Clara, CA (US); John R. Chang, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 478 days.

(21) Appl. No.: 10/918,614

(22) Filed: Aug. 13, 2004

(51) Int. Cl.
*G06F 9/445* (2006.01)

(52) U.S. Cl. .................... 717/174; 717/168; 717/171; 717/175; 717/176

(58) Field of Classification Search ......... 709/201–203, 709/217–219, 238–244; 717/168–178
See application file for complete search history.

(56) References Cited

U.S. PATENT DOCUMENTS

| | | | |
|---|---|---|---|
| 5,155,847 A * | 10/1992 | Kirouac et al. ............... 709/221 |
| 5,999,740 A * | 12/1999 | Rowley ....................... 717/173 |
| 6,009,274 A * | 12/1999 | Fletcher et al. ............. 717/173 |
| 6,332,217 B1 * | 12/2001 | Hastings ..................... 717/178 |
| 6,381,742 B2 * | 4/2002 | Forbes et al. ................. 717/176 |
| 6,493,871 B1 * | 12/2002 | McGuire et al. ............ 717/173 |
| 6,557,054 B2 | 4/2003 | Reisman |
| 6,718,549 B1 * | 4/2004 | Narin et al. ................. 717/178 |
| 6,725,453 B1 | 4/2004 | Lucas et al. |
| 6,751,795 B1 | 6/2004 | Nakamura |
| 6,754,896 B2 | 6/2004 | Mishra et al. |
| 7,000,230 B1 * | 2/2006 | Murray et al. ............... 717/172 |
| 7,155,713 B1 * | 12/2006 | Burkhardt et al. ............ 717/175 |
| 2002/0174422 A1 * | 11/2002 | Kelley et al. ................. 717/178 |
| 2004/0003266 A1 * | 1/2004 | Moshir et al. ................ 713/191 |
| 2004/0003389 A1 * | 1/2004 | Reynar et al. ................ 717/178 |
| 2004/0181561 A1 * | 9/2004 | Knox et al. .................. 707/203 |
| 2004/0181787 A1 * | 9/2004 | Wickham et al. ............ 717/168 |
| 2004/0205709 A1 * | 10/2004 | Hiltgen et al. ............... 717/115 |
| 2005/0010916 A1 * | 1/2005 | Hagen et al. ................. 717/170 |
| 2005/0055686 A1 * | 3/2005 | Buban et al. ................. 717/170 |

OTHER PUBLICATIONS

Bailey, "Maximum RPM Taking the Red Hat Package Manager to the Limit", 2000, Red Hat, Inc.*

* cited by examiner

*Primary Examiner*—Lewis A Bullock, Jr.
*Assistant Examiner*—Jue S Wang
(74) *Attorney, Agent, or Firm*—Blakely, Sokoloff, Taylor & Zafman LLP

(57) ABSTRACT

Mechanism for determining applicability of a software package for installation is described herein. In one embodiment, a process is provided to retrieve authentication information of a component from an installation descriptor file, where the descriptor file describes installation information of the software package. The software package may include one or more components and each component having zero or more sub-components. For at least one sub-component of at least one existing component that has already been installed, an image of the sub-component is authenticated using an authentication key extracted from the authentication information to determine whether the component can be installed based on the existing component. Other methods and apparatuses are also described.

39 Claims, 13 Drawing Sheets

Component Descriptor Example 200

Component Version Timeline
300

```xml
<?xml version="1.0" encoding="UTF-8"?>
<!DOCTYPE plist PUBLIC "-//Apple Computer//DTD PLIST 1.0//EN"
"http://www.apple.com/DTDs/PropertyList-1.0.dtd">
<plist version="1.0">
<dict>
    <key>CFBundleGetInfoString</key>
    <string>MacOSXUpdate10.3.4Patch</string>
    <key>CFBundleIdentifier</key>
    <string>com.apple.pkg.MacOSXUpdate10.3.4Test</string>
    <key>CFBundleName</key>
    <string>MacOSXUpdate10.3.4Patch</string>
    <key>CFBundleShortVersionString</key>
    <string>10.3.4</string>
    <key>IFMajorVersion</key>
    <string>7</string>
    <key>IFMinorVersion</key>
    <string>1773</string>
    <key>IFPkgBuildDate</key>
    <date>2004-04-28T21:35:42Z</date>
    <key>IFPkgBuildVersion</key>
    <string>7H46b</string>
    <key>IFPkgFlagAllowBackRev</key>
    <false/>
    <key>IFPkgFlagAuthorizationAction</key>
    <string>RootAuthorization</string>
    <key>IFPkgFlagDefaultLocation</key>
    <string>/</string>
    <key>IFPkgFlagFollowLinks</key>
    <true/>
    <key>IFPkgFlagInstallFat</key>
    <true/>
    <key>IFPkgFlagInstalledSize</key>
    <integer>5778</integer>
    <key>IFPkgFlagIsRequired</key>
    <false/>
    <key>IFPkgFlagOverwritePermissions</key>
    <false/>
    <key>IFPkgFlagRelocatable</key>
    <false/>
    <key>IFPkgFlagRestartAction</key>
    <string>RequiredRestart</string>
    <key>IFPkgFlagRootVolumeOnly</key>
    <false/>
    <key>IFPkgFlagUpdateInstalledLanguages</key>
    <true/>
    <key>IFPkgFlagUseUserMask</key>
    <false/>
    <key>IFPkgFormatVersion</key>
    <real>0.10000000149011612</real>
```

```
<key>IFPkgComponents</key>      } 605
<array>
        <dict>
606         <key>Bundle</key>
            <dict>
                <key>BundleVersion</key>
                <dict>
                    <key>BuildVersion</key>
                    <string>1</string>
                    <key>CFBundleShortVersionString</key>
611             <string>1.203.18</string>
                    <key>CFBundleVersion</key>
                    <string>1.203.18</string>
                    <key>SourceVersion</key>
                    <string>2031800</string>
                </dict>
                <key>CFBundleIdentifier</key>
607         <string>com.apple.CoreGraphics</string>  } 608
                <key>CFBundleName</key>
                <string>CoreGraphics</string>
                <key>PreBundleVersion</key>
                <dict>
                    <key>BuildVersion</key>
                    <string>7</string>
                    <key>CFBundleShortVersionString</key>
610             <string>1.203.17</string>
                    <key>CFBundleVersion</key>
                    <string>1.203.18</string>
                    <key>SourceVersion</key>
                    <string>2031700</string>
                </dict>
            </dict>
            <key>DefaultPath</key>  ____/ 612
```

<string>/System/Library/Frameworks/ApplicationServices.framework/Versions/A/Frameworks/CoreGraphics.framework</string>

```
            <key>Files</key>
            <dict>
613         <key>./Versions/A/CoreGraphics</key>  ____ 614
                <dict>
                    <key>IsPatch</key>            } 616
                    <true/>
                    <key>PostSHA1</key>
                    <data>                        } 618
                    2DdKngSzRtownt5tf8Rwbw/sZQc=
                    </data>
                    <key>PreSHA1</key>
                    <data>                        } 619
                    aGPdJZTK8LsM3HaTMCt6XwZm0p8=
                    </data>
                </dict>
                <key>./Versions/A/Resources/libPDFRIP.A.dylib</key>
```

Fig. 6B

```
                    <dict>
                        <key>IsPatch</key>
620                     <true/>
                        <key>PostSHA1</key>
                        <data>
                        W+j7vktxTSykNJ6sBhdCd0xF+Cc=
                        </data>
                        <key>PreSHA1</key>
                        <data>
                        48RSyCDu7lQ4j2aY/h+Et+bg4/A=
                        </data>
                    </dict>
                </dict>
            </dict>
            <dict>
621
                <key>Bundle</key>
                <dict>
                    <key>CFBundleIdentifier</key>
                    <string>com.apple.Safari</string>
                    <key>CFBundleName</key>
                    <string>Safari</string>
                </dict>
                <key>DefaultPath</key>
                <string>/Applications/Safari.app</string>
                <key>Files</key>
                <dict/>
            </dict>
            <dict>
622
                <key>DefaultPath</key>
                <string>/</string>
                <key>Files</key>
                <dict>
                    <key>./System/Library/CoreServices/SystemVersion.plist</key>
                    <dict>
623                     <key>IsPatch</key>
                        <true/>
                        <key>PostSHA1</key>
                        <data>
                        KT4S6izxuK+zQRHOqUCkM0ZPEBo=
                        </data>
                        <key>PreSHA1</key>
                        <data>
                        PRn5s8Da8yE+TkK/jeukoFLc4Ag=
                        </data>
                    </dict>
                    <key>./usr/bin/ls</key>
                    <dict>
624                     <key>IsPatch</key>
                        <true/>
                        <key>PostSHA1</key>
                        <data>
                        wnaxgr7rAYt2tHcledmPVMQhD0k=
                        </data>
```

Fig. 6C

```
                                    <key>PreSHA1</key>
                                    <data>
                                    UPJVU1Z/Dj/Th12cYDuGjo5rwbk=
                                    </data>
                                </dict>
                                <key>./System/Library/StartupItems/NFS/NFS</key>
                          ┌──── <dict>
                625 ─────┘        <key>IsPatch</key>
                                    <true/>
                                    <key>PostSHA1</key>
                                    <data>
                                    pdMKk613sHJCAiB/YTOQR0KCZRc=
                                    </data>
                                    <key>PreSHA1</key>
                                    <data>
                                    4fLnwn9eOg7AbVDvgpstO+LEcS4=
                                    </data>
                                </dict>
                            </dict>
                        </dict>
                    </array>
</dict>
</plist>
```

Fig. 6D

MECHANISM FOR DETERMINING APPLICABILITY OF SOFTWARE PACKAGES FOR INSTALLATION

FIELD OF THE INVENTION

The present invention relates generally to computer systems. More particularly, this invention relates to mechanism for determining applicability of software packages for installation.

BACKGROUND OF THE INVENTION

Most popular software products nowadays constantly go through revisions to fix "bugs" or add new features and functionality. To that end, each revision of a software product or component may require the addition of new files, the replacement of existing files with newer versions of files, and/or removal of a file. Once a vendor has isolated a software product problem and created a solution for the problem, they would want to put that fix into an update and make the update widely available to the customers. Software vendors have a business incentive to distribute software updates to customers as quickly and trouble-free as possible.

The Internet provides a channel for customers to obtain the latest updates for software products. The vendor sites on the Internet can be designed to make it very simple to discover and locate updated files for an application. The technical aspects of file downloading have mostly disappeared from the user's view, and are now typically handled by the operating system.

To minimize the size of the updates over the Internet, software companies utilize file patches, which contain only the changes that must be made to pre-existing files, rather than the whole files themselves. A patch assumes that the original file on the target system is of a specific state. "Patching" applies changes to that file to bring the file to a desired, usually newer, state. However, the file should be verified to be in the required condition. Otherwise, the patch may be incorrectly applied and the file may be damaged. If a file to be patched is in an unexpected state, the patch cannot be applied. In addition, if the client machine has a sub-component that has a newer version than the one about to be upgraded, a conventional installation may abort the whole installation, even though there might be other sub-components that have older versions.

SUMMARY OF THE INVENTION

Mechanism for determining applicability of software packages for installation is described herein. In one embodiment, a process is provided to retrieve authentication information for a component from an installation descriptor file, where the descriptor file describes installation information pertaining to the software package. The software package may include one or more components and each component having zero or more sub-components. For at least one sub-component of at least one existing component that has already been installed, an image of the sub-component is authenticated using an authentication key extracted from the authentication information, to determine whether the component can be installed based on the existing version of the component.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 6A-6D are an example of an installation descriptor file written in XML according to one embodiment of the invention.

DETAILED DESCRIPTION

Figure 1:
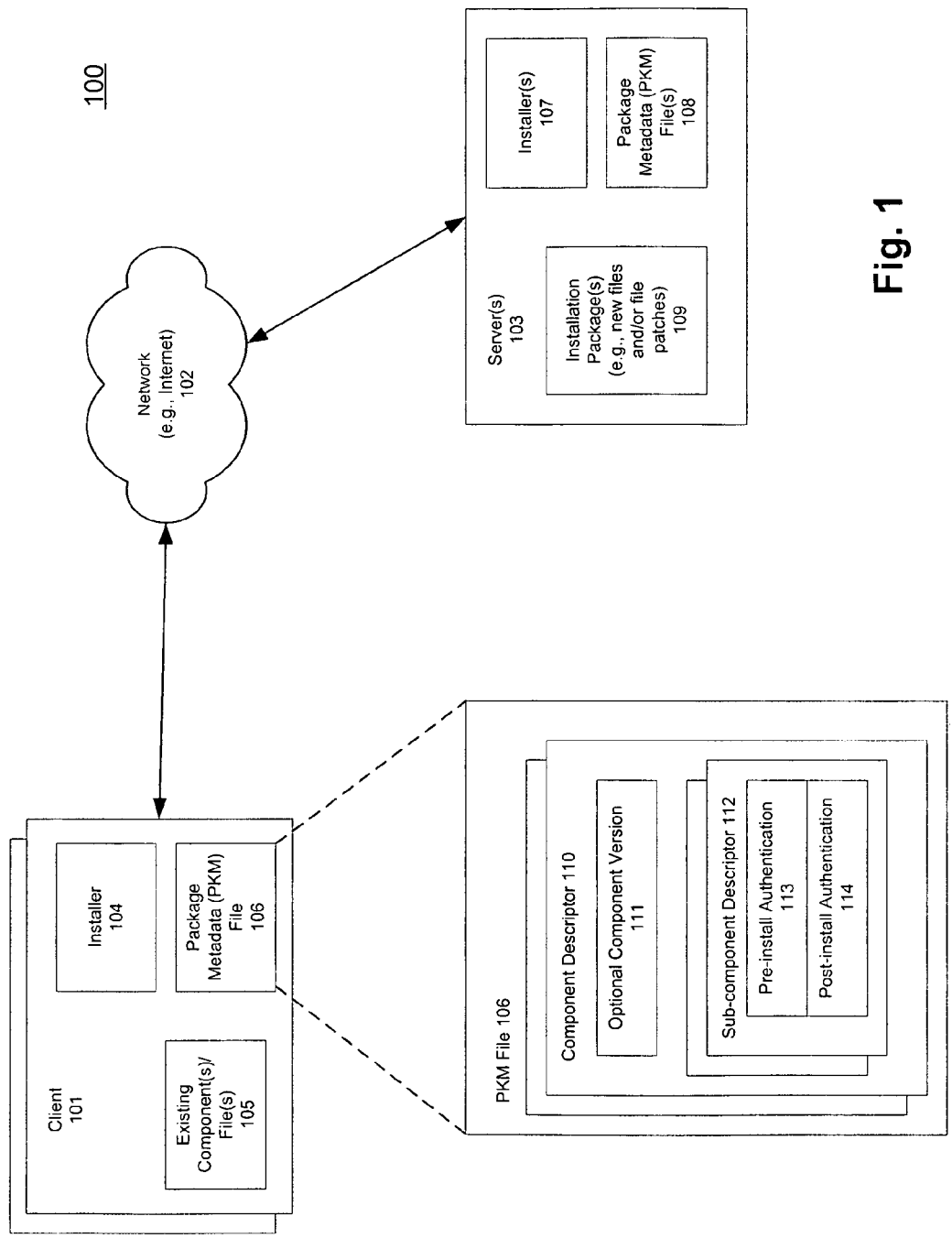
FIG. 1 is a diagram of a network of computer systems in which one or more clients may download and install a software package from a server.

Mechanism for determining applicability of software packages for installation is described herein. According to one embodiment, an installation package is optimized by size, containing a combination of patches and/or full files. Installation of the package ensures that the user will have at least the version of the software included in the package. In one embodiment, the content of an installation package includes patches for some files and/or full versions of some other files, dependent upon the configurations.

In one embodiment, the package further includes a package description file, which may be used by an installer to determine whether the installation package can be installed. The package description file, also referred to as installation descriptor file or a package metadata (PKM) file, describes the contents of the installation package with sufficient details to allow the installation system to determine whether the software package can be installed on a client system.

In addition, the PKM file further includes one or more components and each component includes zero or more files (e.g., sub-components or child components). The files to be updated or added to the client system are divided into distinct, non-overlapping components. The information contained in the PKM file about the individual files is grouped by component.

Further, according to one embodiment, two types of versioning may be used: component version for some of the components and authentication information for authenticating or determining authenticity of at least some of the files for each component. In one embodiment, there may be two versions specified for at least some of the components that have patched files in the distribution. The first version is the version of the component that is expected to be on the client system prior to applying the patches, also referred to as a pre-install version. The second version is the version of the component that the client system will contain after the patches are applied, also referred to as a post-install version. Alternatively, more or less versions may be implemented.

In one embodiment, the authentication information includes at least one authentication key, which may be used to authenticate a file image of at least some files of a component or alternatively, to authenticate the component itself. In a particular embodiment, the authentication key may include a checksum value and the authentication operations may include a checksum operation. In a further embodiment, the authentication information includes a pre-install authentication key and a post-install authentication key. The pre-install authentication key may be used to authenticate the pre-existing file corresponding to the file being installed. The post-install authentication key may be used to verify whether a particular file has already been installed. Similarly, the pre-install and post-install authentication keys may be checksum values (e.g., pre-install and post-install checksum values).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device; that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. Alternatively, a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a diagram of a network of computer systems in which one or more clients may download and install a software package from a server. As shown in FIG. 1, a network 100 includes a number of client computer systems 101 that are coupled together through a network 102, for example, an Internet. Alternatively, the term "Internet" refers to a network of networks. Such networks may use a variety of protocols for exchange of information, such as TCP/IP, ATM, SNA, SDI, etc. The physical connections of the Internet and the protocols and communication procedures of the Internet are well known to those in the art. Such a system may be implemented in an Intranet within an organization.

Access to the Internet 102 is typically provided by Internet service providers (ISPs). Users on client systems, such as the client computer systems 101, generally obtain access to the Internet through Internet service providers. Access to the Internet may facilitate transfer of information (e.g., email, text files, media files, etc.) between two or more digital processing systems and/or a server system 103, which may be a Web server. For example, one or more of the client computer systems and/or the Web server may provide document presentations (e.g., a Web page) to another one or more of the client computer systems and/or Web server.

For example, in one embodiment of the invention, one or more client computer systems 101 may request to access a document that may be stored at a remote location, such as the Web server 103. In the case of remote storage, the data may be transferred as a file (e.g., download) and then displayed (e.g., in a window of a browser) after transferring the file. In another embodiment, the document presentation may be stored locally at the client computer systems. In the case of local storage, the client system may retrieve and display the document via an application, such as a word processing application, without requiring a network connection.

The server 103 typically includes at least one computer system to operate with one or more data communication protocols, such as the protocols of the World Wide Web, and as such, is typically coupled to the Internet 102. Optionally, the server 103 may be part of an ISP which may provide access to the Internet and/or other network(s) for client computer systems. The client computer systems 101 may each, with appropriate Web browsing software, access data, such as HTML documents (e.g., Web pages), which may be provided by the server 103.

The ISP provides Internet connectivity to the client computer system 101 via a network interface, which may be considered as part of the client computer system. The client computer systems may be a conventional data processing system, such as a Power Mac G5 or iMac computer available from Apple Computer, Inc., a "network" computer, a handheld/portable computer, a cell phone with data processing capabilities, a Web TV system, or other types of digital processing systems (e.g., a personal digital assistant (PDA)).

However, as depicted in FIG. 1, such connectivity may vary between various client computer systems. For example, the client computer system 101 may be part of a local area network (LAN). The network interface of the client 101 may represent an analog modem, an ISDN modem, a DSL modem, a cable modem, a wireless interface, or other interface for coupling a digital processing system, such as a client computer system, to another digital processing system.

Alternatively, the network interface of client 101 may be an Ethernet-type, asynchronous transfer mode (ATM), or other type of network interface, which may couple the client 101 to a local area network (LAN). The LAN may also be coupled to a gateway digital processing system, which may provide firewall and other Internet-related services for a LAN. The gateway digital processing system, in turn, is coupled to the ISP to provide Internet connectivity to the client computer systems 101. The gateway digital processing system may, for example, include a conventional server computer system. Similarly, the server 103 may, for example, include a conventional server computer system.

In one embodiment, server 103 may be a Web server that provides software upgrade packages, which may include one or more software packages 109. Alternatively, the server 103 may be file server of a local network, such as, for example, an Intranet. For each of the software packages 109, there may be an installer 107 and a PKM file 108 associated with the respective software package. The installer 107 may be shared by some or all installation of software packages 109. The installer 107 is capable of reading the installation description from the respective PKM file and correctly installs the respective software package.

When client system 101 requires an upgrade, the client 101 may download the installer 104 and the PKM file 106 corresponding to the software package being installed. Alternatively, the client system 101 includes the installer 104 pre-installed when the client system was manufactured. In which case, the client 101 only needs to download the PKM file 106. In one embodiment, the installer 104 retrieves installation description from the PKM file 106 to determine the installation configuration of the respective software package being installed. The installation description may include versioning and authentication information, which may be used to verify one or more existing components and/or files 105 that have already been installed in the client 101 from which the new patches or components may be installed.

In one embodiment, the PKM file 106 includes one or more component descriptors 110 describing installation of the corresponding one or more components. Each of the components described by the descriptors 110 may optionally include version information 111 associated with the respective component. In addition, each of the component descriptors may include zero or more sub-component descriptors 112 describing installation of zero or more files grouped under the respective component.

In one embodiment, at least some of the sub-component descriptors 112 may include a pre-install authentication key 113 and a post-install authentication key 114. The pre-install authentication key 113 may be used to authenticate the pre-existing sub-component corresponding to the sub-component being installed. The post-install authentication key 114 may be used to verify whether a particular sub-component has already been installed. In a particular embodiment, pre-install and post-install authentication keys may be checksum values.

In one embodiment, a sub-component may be a file associated with a component. Throughout this application, for the purposes of illustrations, a file and a sub-component are used interchangeably. However, they are not so limited. A sub-component, as a parent component, may further include one or more sub-components (e.g., child components).

According to one embodiment, the installation system uses the information retrieved from the PKM file 106 to ensure that the client will have at least the version of each of the software components included in the installation package when the installation is completed. Since performing authentication (e.g., a checksum operation) on a file is a relatively time-expensive operation, the component version 111 may be used to optimize the install target verification process.

For example, if the version of a particular component on the client system is not what is required for the patch (e.g., the pre-install version) and it is not the post-install version or newer (e.g., the updated component has already been installed), the installer would know by comparing the version of the existing component and the version retrieved from the PKM file, without having to perform the authentication on each file of the existing component, that the client system does not meet the requirement of the installation package.

Similarly, if the client system's version of a component is already the same or newer than the version contained in the package (e.g., the post-install version), the installation system does not need to install the files for that component, while allowing the rest of the installation package to proceed.

If the installer 104 determines that the version of the existing component on the client system 101 is the pre-install version, the installer 104 may further perform the authentication on each of the sub-components described by the sub-component descriptors 112 to ensure that the sub-components have not been tampered with and are of the exact state required by the patch, using the pre-install authentication information 113.

If the authentication of the sub-component is not performed successfully (e.g., the checksum operation does not match with the corresponding checksum value retrieved from the PKM file 106), the post-install authentication information 114 may be used to verify whether the sub-component (e.g., file) being updated has already been installed in the client system 101. In such a case, the sub-component does not need to be installed (e.g., skipping). On the other hand, if the post-install authentication is not performed successfully, the patch cannot be applied to the client system 101 and the installation of the entire software package should not be allowed.

In one embodiment, the PKM file 106 and/or installer 104 are initially downloaded from the server 103 to the client system 101 without downloading the actual software package 109 being installed. With the PKM file 106, the installer 104 is capable of determining whether the software package (e.g., the patches) can be installed on the client system 101, or alternatively, a full installation of the software may be needed. Once the installer 104 determines that the software package may be installed based on the existing components and/or files 105, the installer 104 may download the necessary patch files (e.g., only those that would be installed) from the server 103 to install the patches. Alternatively, according to another embodiment, if the installer determines that the existing components and/or files 105 of the client 101 cannot be patched (e.g., only certain files need to be updated), the installer 104 may download the full installation image of the software (e.g., full version) and perform a complete installation of the software, which consumes more time and resources.

According to another embodiment, the PKM file 108 may provide additional information regarding other portions of the package that are located on other media. For example, if a particular software distribution is packaged on multiple CDs, the PKM file of the first CD may provide information regarding the files stored in the subsequent CDs. At the beginning of the installation, a user can choose which of the packages she would like to install from the subsequent CDs without having to insert the subsequent CDs, where the installer can simply read the PKM files for those packages existing elsewhere.

It will be appreciated that server 103 may include multiple servers separated from each other. Some or all of the components 107-109 may be located on different servers. For example, the installer 107 and the PKM files 108 may be downloaded from a first server. After the installer 107 determines, based on the PKM files 108, which patches may be installed at a client machine, the actual patches to be installed may be downloaded from a second server. Other configurations may exist.

Figure 2:
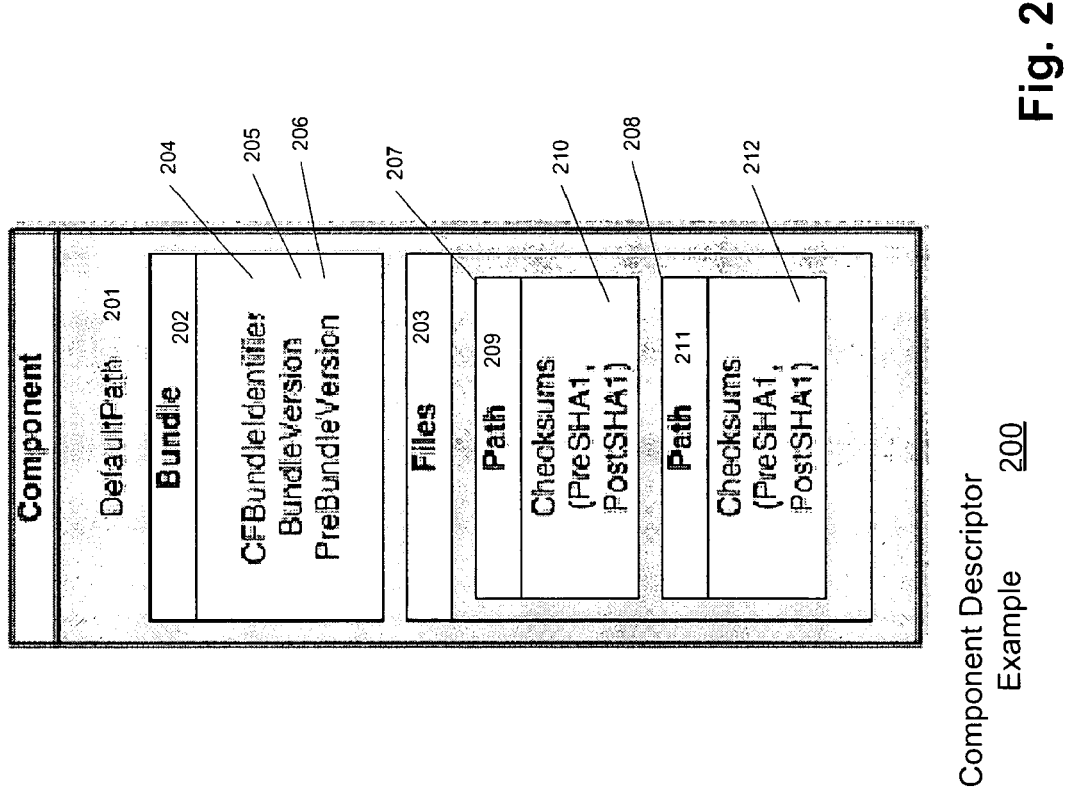
FIG. 2 is a block diagram illustrating an exemplary component descriptor of an installation descriptor file according to one embodiment of the invention.

FIG. 2 is a block diagram illustrating an exemplary component descriptor of an installation descriptor file according to one embodiment of the invention. The exemplary component descriptor 200 may be implemented, for example, as a component descriptor 110 of FIG. 1. Referring to FIG. 2, exemplary component 200, also referred to as a bundle, includes a default path 201 indicating where the component is being installed. The exemplary component 200 also includes a bundle information block 202 to specify the specific information associated with the respective bundle. In one embodiment, the information block 202 includes an identifier 204 for identifying the respective bundle, a bundle version 205 indicating the version of the bundle being installed and a pre-bundle version of an existing bundle on top of which the new bundle is to be installed.

The exemplary component 200 further includes files block 203 having zero or more files 207-208 (e.g., sub-components). Each of the files 207-208 may include a path 209 and 211 respectively to specify where the file will be installed and authentication keys 210 and 212 to provide authentication information; including pre-install and post-install authentication keys to the installer to perform authentication operations.

Figure 3:
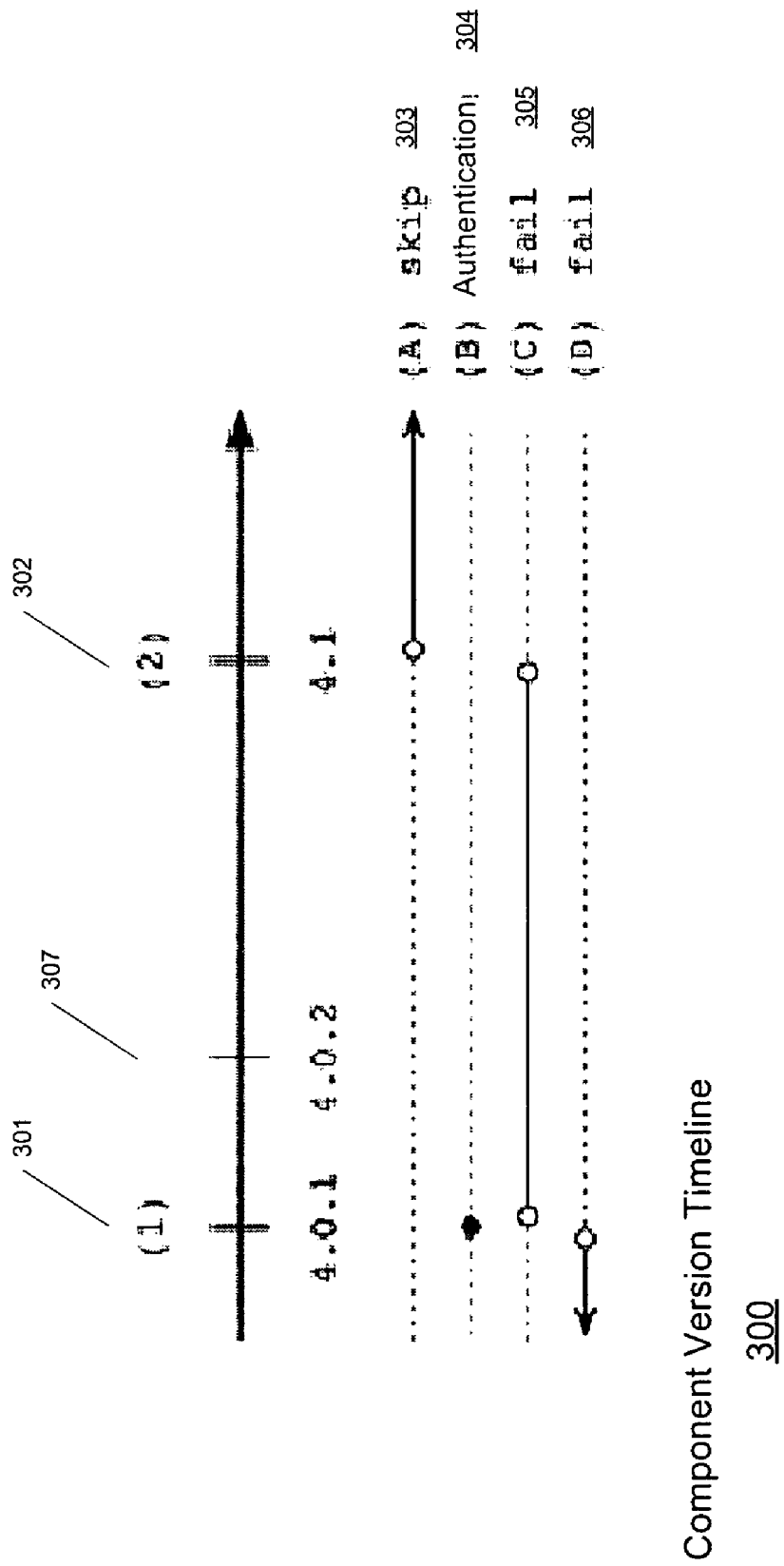
FIG. 3 is a timeline illustrating a version timeline of a software package upgrade according to one embodiment.

FIG. 3 is a timeline illustrating a version timeline of a software package upgrade according to one embodiment. In this embodiment, the exemplary timeline 300 includes a software package having a component with newer version 302 that is intended to be installed on a system with previous version of an existing component 301. That is, the component having version 302 is intended to be installed on a client machine that already has a previous component having version 301. If the existing component has any other version between the versions 302 and 301, such as, for example, version 307, the installation of the component (e.g., the upgrade) would not be allowed.

Referring to FIG. 3, the installer opens and parses a PKM file to identify each of the components being installed. If the respective component is a versioned component (e.g., the component has a specific version, which may be described in a version block such as version block 111 of FIG. 1), the installer examines the version of the corresponding existing component. If the version of the existing component is the same or newer than the version of the component that is about to be installed, in this case, situation 303, the component does not need to be installed and the installation of the component will be skipped.

If the version of the existing component is the same as the pre-install version retrieved from the PKM file (e.g., the existing component is the targeted component from which the new component will be installed), in this case, situation 304, the installer may further authenticate at least one of the sub-components of the existing component using the pre-install authentication information retrieved from the PKM file. If the authentication is performed successfully, the new component will be installed based on the existing component. Otherwise, the installation may be aborted. Similarly, if the version of the existing component is older than the pre-install version (e.g., situation 306) or between the pre-install version and the post-install version, such as version 307 (e.g., situation 305), the installation may be aborted.

Figure 4:
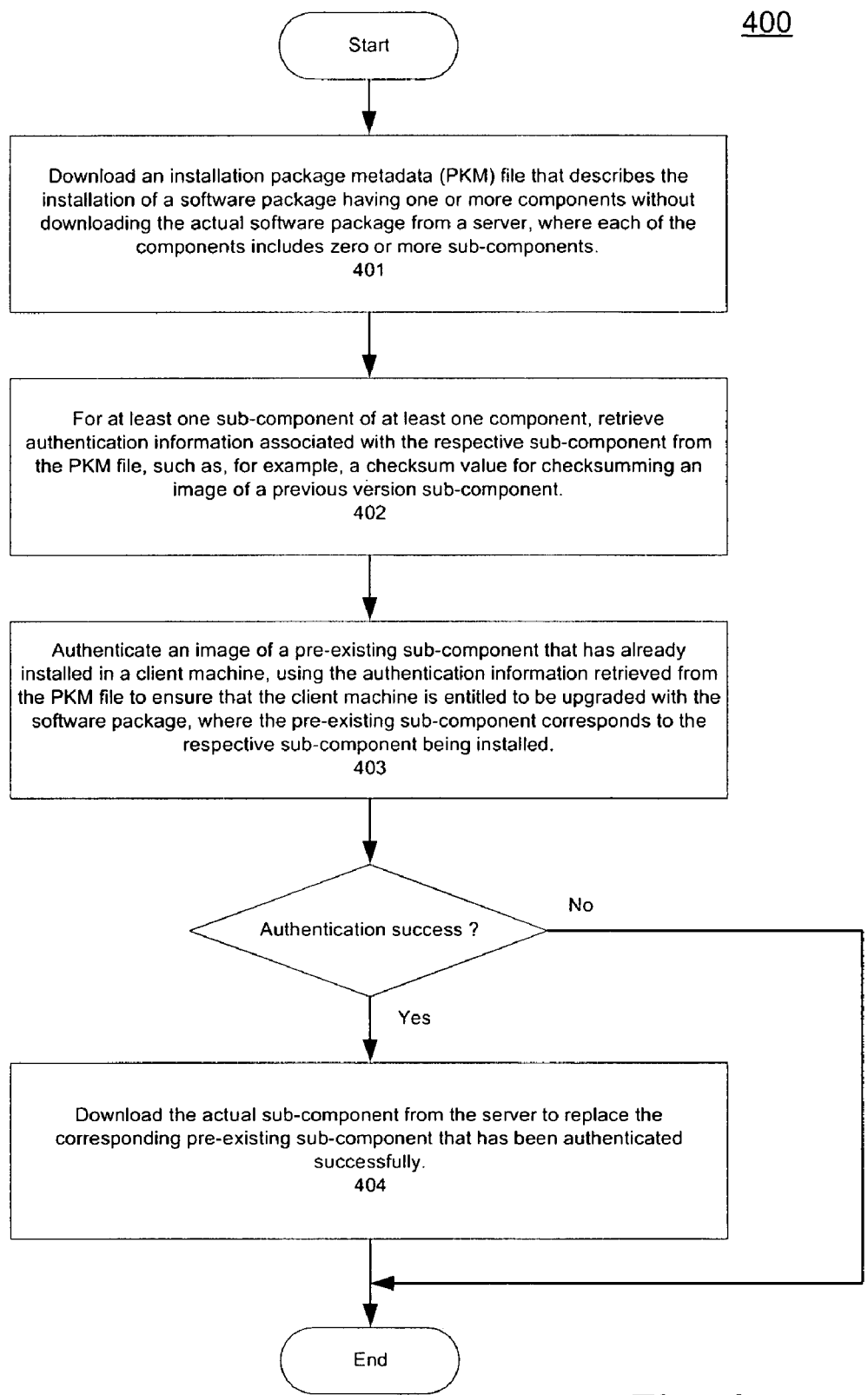
FIG. 4 is a flow diagram illustrating an exemplary process for installing a software package according to one embodiment of the invention.

FIG. 4 is a flow diagram illustrating an exemplary process for installing a software package according to one embodiment of the invention. Exemplary process 400 may be performed by a processing logic that may comprise hardware (circuitry, dedicated logic, etc.), software (such as is run on a dedicated machine), or a combination of both. For example, the exemplary process 400 may be performed by an installer using a PKM file, such as, for example, installer 104 using PKM file 106 of FIG. 1.

In one embodiment, exemplary process 400 includes, but is not limited to, downloading from a server over a network a package metadata (PKM) file describing installation of the software package without downloading the software package. The software package including one or more components and each of the components having zero or more sub-components, authenticating an image of at least one sub-component of at least one existing component from which the software package is installed, wherein the authentication is performed using a first key retrieved from the PKM file, and downloading at least a portion of the software package from the server to be installed if the image of at least one sub-component is authenticated successfully using the first key retrieved from the PKM file.

Referring to FIG. 4, at block 401, a PKM file is downloaded from a server over a network. In one embodiment, an installer application (e.g., installer 104 of FIG. 1) may also be downloaded with the PKM file. The PKM file may provide sufficient information describing the installation of a software package being installed. The software package may include one or more components (e.g., bundles) and each component may include zero or more files. The PKM file may be a metadata file written in a variety of programming languages, such as, for example, XML and HTML (hypertext markup language). In one embodiment, the actual software package has not been downloaded yet at this point. The PKM file may be downloaded over the Internet from a Web server using a variety of protocols, for example, TCP/IP protocols. Alternatively, the PKM file may be downloaded from a server within a local network (e.g., the Intranet or LAN).

At block 402, for at least one file of at least one component of the software package, the authentication information associated with the respective file is retrieved from the PKM file. The authentication information may be used to authenticate an image of an existing sub-component (e.g., file) of an existing component to determine whether a new version of the component may be installed on the basis of the existing sub-component of the existing component. In one embodiment, the authentication information includes an authentication key for authenticating the sub-component.

At block 403, an authentication operation is performed on the existing sub-component of the existing component that has already been installed in a client machine, using the authentication information retrieved from the PKM file, for example, an authentication key. In one embodiment, the authentication key may include a checksum value and the authentication operation includes a checksum operation performed on the sub-component using the checksum value.

If the authentication is performed successfully, at block 404, the actual sub-components and/or the respective component may be downloaded from the server and installed in the client machine. In an alternative embodiment, if the authentication is performed unsuccessfully, a full installation image of the software package, rather than patches, may be downloaded and the full installation may be invoked.

Figure 5:
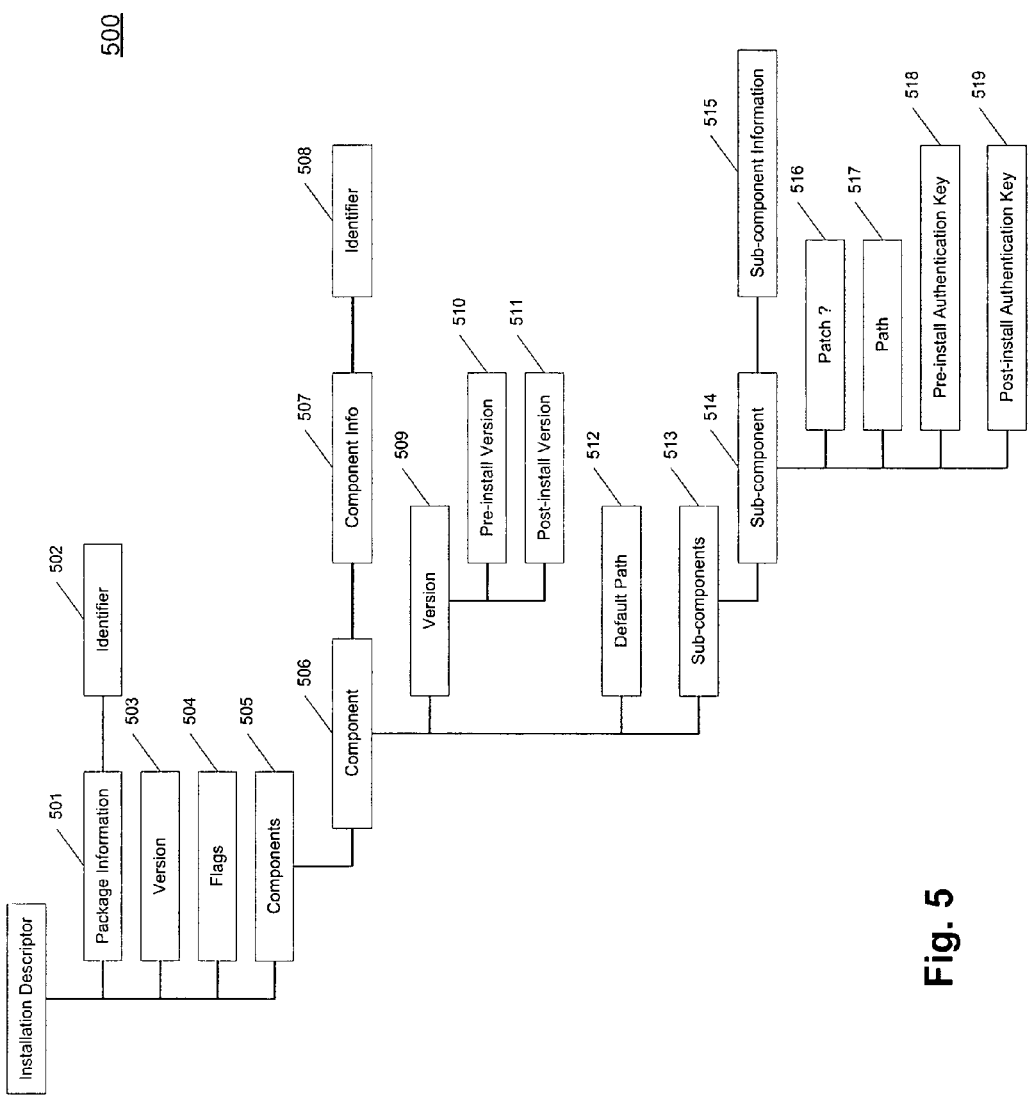
FIG. 5 is a block diagram illustrating an exemplary document-type definition (DTD) file of an installation descriptor according to one embodiment of the invention.

FIG. 5 is a block diagram illustrating an exemplary document-type definition (DTD) file of an installation descriptor according to one embodiment of the invention. An example of an installation descriptor written in XML is shown in FIGS. 6A-6D according to certain embodiments of the invention. However, the installation descriptor is not limited to XML. It will be appreciated that other languages, such as, for example, HTML (hypertext markup language) may also be used.

Referring to FIGS. 5 and 6A-6D, exemplary DTD 500 includes a package information tag 501 for describing general information regarding the software package being installed. For example, among other information, the package information 501 may include an identifier tag 502 to provide an identifier for identifying the software package being installed. In one embodiment, the identifier specified by the identifier tag 502 may be a unique identifier specifically identifying the package. An example of a package information block and the identifier tag in XML are shown as package information block 601 and identifier 602 in FIG. 6A.

The exemplary DTD 500 may also include a version block 503. An example of a version block is shown as version block 603 in FIG. 6A. In one embodiment, the version of the software package being installed may include at least one of a short version, a major version, a minor version, a build version, and/or a build date. Other version related information may be included.

The exemplary DTD 500 may also include one or more flags which may be implemented within a flag block 504. An example of a flag block is shown as a flag block 604 in FIG. 6A. In one embodiment, a variety of flags may be implemented within the flag block 504. For example, there may be a flag that indicates whether the client system has to restart after the installation of the package.

In addition, according to one embodiment, the exemplary DTD 500 includes a component block (e.g., a component array) 505 that may include one or more components 506. Each of the components may or may not include one or more sub-components 513, for example, one or more sub-components grouped under the respective component. For example, the exemplary installation descriptor 600 shown in FIGS. 6A-6D includes components 606 and 621-622, which may include zero or more sub-components respectively. In the example shown in FIGS. 6A-6D, component 606 includes sub-components 614 and 620, and component 622 includes sub-components 623-625. In a further embodiment, certain sub-components may further include their respective sub-components (e.g., child components).

Referring back to FIG. 5, each component 506 may include a component information tag 507 and an identifier tag 508. An example of a component information block and an identifier tag are shown as tags 607 and 608 in FIG. 6B. In one embodiment, the component identifier includes a string that uniquely identifies a component (e.g., a bundle) of a client machine. This information may be found in a predetermined location of the client machine and may be hidden from a user of the client machine, such that the user may not easily modify it.

Further, each component 506 may include a default path tag 512 specifying where the component, including the sub-components, may be installed. However, a specific sub-component may further specify a path which may override the default path of the parent component.

In one embodiment, a component may or may not be a versioned component. That is, a component may or may not have an associated version number, string, or combination of both. If a component is a versioned component, the component may include a version block 509, which may include a pre-install version 510, a post-install version 511, and/or other version related information.

Pre-install version 510 may be used to represent the version of the component that is required to patch the existing component (e.g., an existing component that has already been installed in the client machine prior to the current installation). In other words, the pre-install version 510 may be the version of the component used as a "baseline" from which the patches are generated. Post-install version 511 may be used to represent the version of the component being installed (e.g., a new component version). Post-install version 511 is the version to which the described software package will update the client machine. That is, the post-install version 511 is the version the component has after the current installation. In one embodiment, each of the pre-install and post-install versions includes at least one of a build version, a version string, a component version, and/or a source version, where the source version is an identifier that uniquely identifies a snapshot of the sources in time. An example of a pre-install and a post-install versions is shown as a pre-install version 610 and a post-install version 611 in FIG. 6B.

Furthermore, according to one embodiment, each of the components 505 may or may not include a sub-component block describing one or more sub-components 514. Similar to the parent component, the sub-component 514 may further include a sub-component information tag 515 describing the respective sub-component. The sub-component 514 may optionally include a path 517 specifying a path at which the respective sub-component may be installed. The path 517 may be used to override or supplement the default path 512 of the parent component 506. In one embodiment, the sub-component path may be the actual location within the component's location/directory structure. The sub-component path, combined with the path of the component, identifies the location at which the file should be installed or patched. If the path 517 is absent, the respective sub-component may be installed according to the default path 512 of the parent component 506.

Further, according to one embodiment, if the sub-component 514 is a patch, which is indicated by the flag 516, the sub-component 514 may further include a pre-install authentication key 518 and/or a post-install authentication key 519. In a particular embodiment, the pre-install and/or post-install authentication keys may include checksum values and the authentication operations may include checksum operations. It will be appreciated that other authentication mechanisms may be utilized.

In one embodiment, the pre-install authentication key 518 may be used to authenticate an image of an existing sub-component that has already been installed on the client machine, which serves as a baseline of the respective patch.

An example of the pre-install authentication key 518 and the post-install authentication key 519 is shown as keys 618 and 619 respectively in FIG. 6B.

In one embodiment, the installer retrieves the pre-install authentication key 518 from the installation descriptor file and authenticates the image of the existing sub-component using the pre-install authentication key 518 to ensure that the existing component satisfies the prerequisites of the patch. If the existing sub-component cannot be authenticated successfully, the patch may not be installed.

The post-install authentication key 519 may be used to authenticate the existing component to determine whether the new version of the component (e.g., the patch) has already been installed. In one embodiment, if the pre-install authentication fails, the installer may optionally use the post-install authentication key 519 to determine whether the new file or component has already been installed. In such a case, the respective patch installation may be skipped. In another embodiment, the post-version of the parent component may be used to determine whether the new component version has already been installed prior to the post-install authentication.

Referring to FIGS. 5 and 6A-6D, according to one embodiment, some of the components may not be patched components. That is, those components may not include patches. In such a case, the version information regarding the patches may not be needed. As a result, the version block 509 and the sub-component block 513 may not be needed, leaving only the identification information 507 and 508, as well as the default path 512 in the descriptor for those components. As a result, a full installation for the respective component may be performed instead of patching. An example of such a component is shown as component 621 of FIG. 6C.

Furthermore, according to one embodiment, certain components may not have an associated version (e.g., the component is not part of a versioned bundle). In such case, the version block 509 may not be needed. However, the pre-install and post-install authentication keys 518 and 519 may be used to authenticate the sub-components of the non-versioned component. An example of a non-versioned component is shown as component 622 of FIG. 6C. Other configurations may exist.

Figure 7:
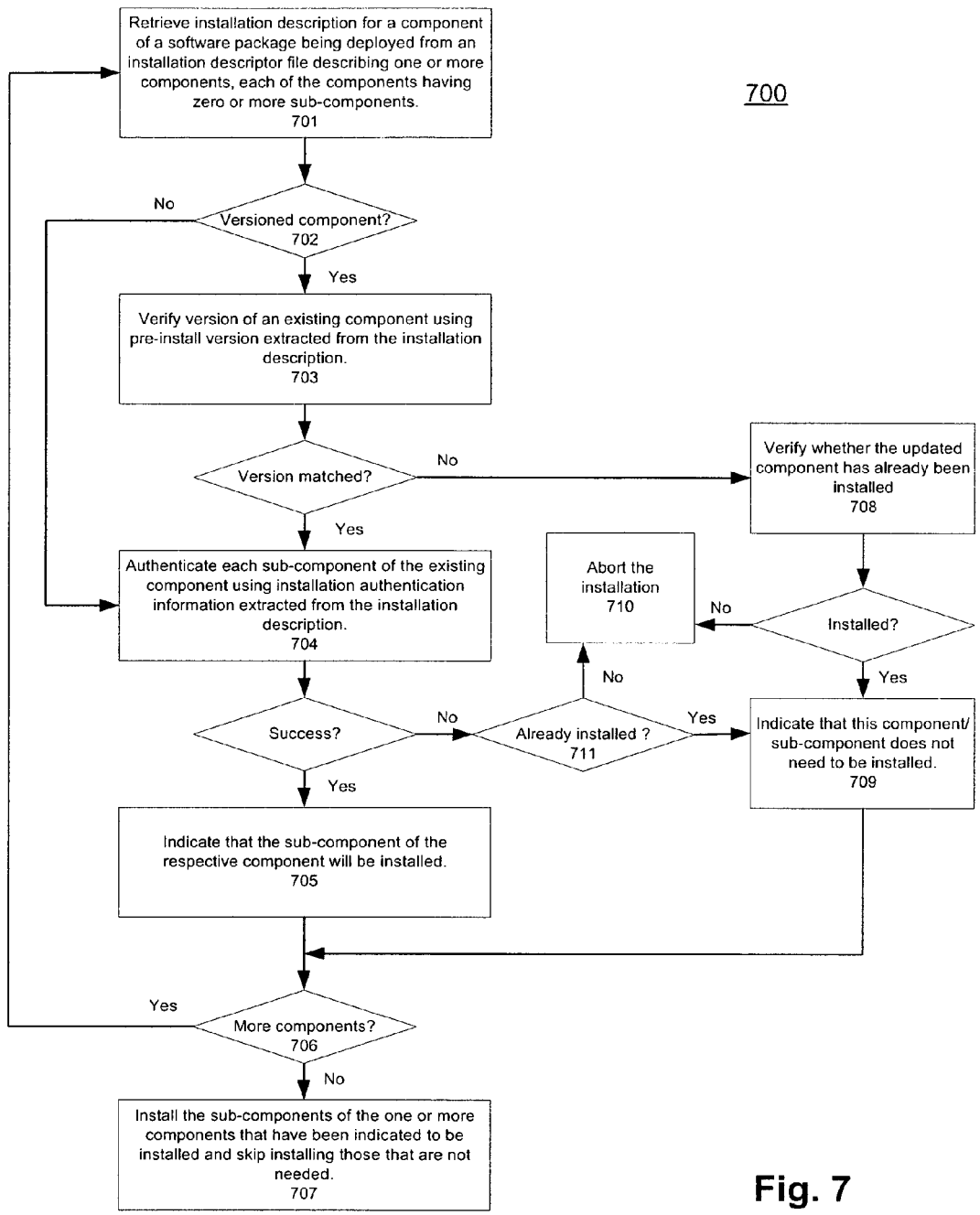
FIG. 7 is a flow diagram illustrating an exemplary process for installing a software package according to one embodiment of the invention.

FIG. 7 is a flow diagram illustrating an exemplary process for installing a software package according to one embodiment of the invention. Exemplary process 700 may be performed by a processing logic that may comprise hardware (circuitry, dedicated logic, etc.), software (such as is run on a dedicated machine), or a combination of both. For example, the exemplary process 700 may be performed by an installer using a PKM file, such as, for example, installer 104 using PKM file 106 of FIG. 1. In one embodiment, exemplary process 700 includes, but is not limited to, retrieving authentication information of a component from an installation descriptor file describing installation of the software package, the software package having one or more components and each component having zero or more sub-components, and authenticating an image of at least one sub-component of an existing component that has already been installed using a first key extracted from the authentication information to determine whether the component can be installed based on the existing component.

Referring to FIG. 7, at block 701, installation description information for a component of a software package being deployed is retrieved from an installation descriptor file (e.g., a PKM file). The installation descriptor file describes installation of one or more components and each component may include one or more sub-components, for example, one or more files. In one embodiment, the installation descriptor file may be a scripting file written in a variety of languages, such as, for example, XML or HTML, etc. The descriptor file may include some or all of the installation information described in accordance with the exemplary DTD 500 of FIG. 5.

At block 702, the respective component is examined to determine whether the component is a versioned component. If the component is a versioned component, at block 703, the version of the existing component corresponding to the component being installed is verified using a pre-install version extracted from the installation information retrieved from the installation descriptor file. The verification is performed to ensure that the client machine being patched contains a pre-required existing component from which (e.g., a baseline) the patches are generated.

If the version of the existing component matches the pre-install version extracted from the installation descriptor file, at block 704, the processing logic authenticates an image of each sub-component of the respective component using one or more authentication keys extracted from the installation information. In one embodiment, the authentication keys include a pre-install authentication key and a post-install authentication key.

The pre-install authentication key may be used to authenticate an image of an existing sub-component that has already been installed on the client machine, which serves as a baseline for the respective patch. The post-install authentication key may be used to authenticate the existing component to determine whether the new component version (e.g., the patch) has already been installed. In a particular embodiment, the pre-install and post-install authentication keys may include checksum values and the authentication operations may include checksum operations. Other authentication mechanisms may be utilized. If the authentication is performed successfully, at block 705, it is indicated that the respective component will be installed subsequently. If the authentication is performed unsuccessfully, at block 711, it is determined whether the sub-component has already been installed. In one embodiment, the authentication is performed using a post-install key extracted from the descriptor file. If the sub-component has already been installed (e.g., post-install authentication is performed successfully), at block 709, the sub-component is indicated that it is does not need to be installed. Otherwise, at block 710, the operation will be aborted.

If the version of the existing component does not match the pre-install version extracted from the installation descriptor file, at block 708, the processing logic verifies whether the updated component has already been installed. In one embodiment, the verification is performed by comparing the version of the existing component with a post-install version extracted from the installation descriptor. Optionally, a post-install authentication may be performed on an image of each sub-component of the existing component, using a post-install authentication key extracted from the installation descriptor file.

If the post-install authentication is performed successfully, at block 709, it is indicated that the respective component does not need to be installed. Otherwise, at block 710, the patching installation may be aborted. At block 706, it is determined whether there are more components that need to be processed based on the installation description retrieved from the installation descriptor file. If there are more components, the above processes may be repeated until no more components have to be processed. At block 707, the components and/or the sub-components that have been indicated are installed and those without indication will be skipped. Other operations may also be performed.

Figure 8:
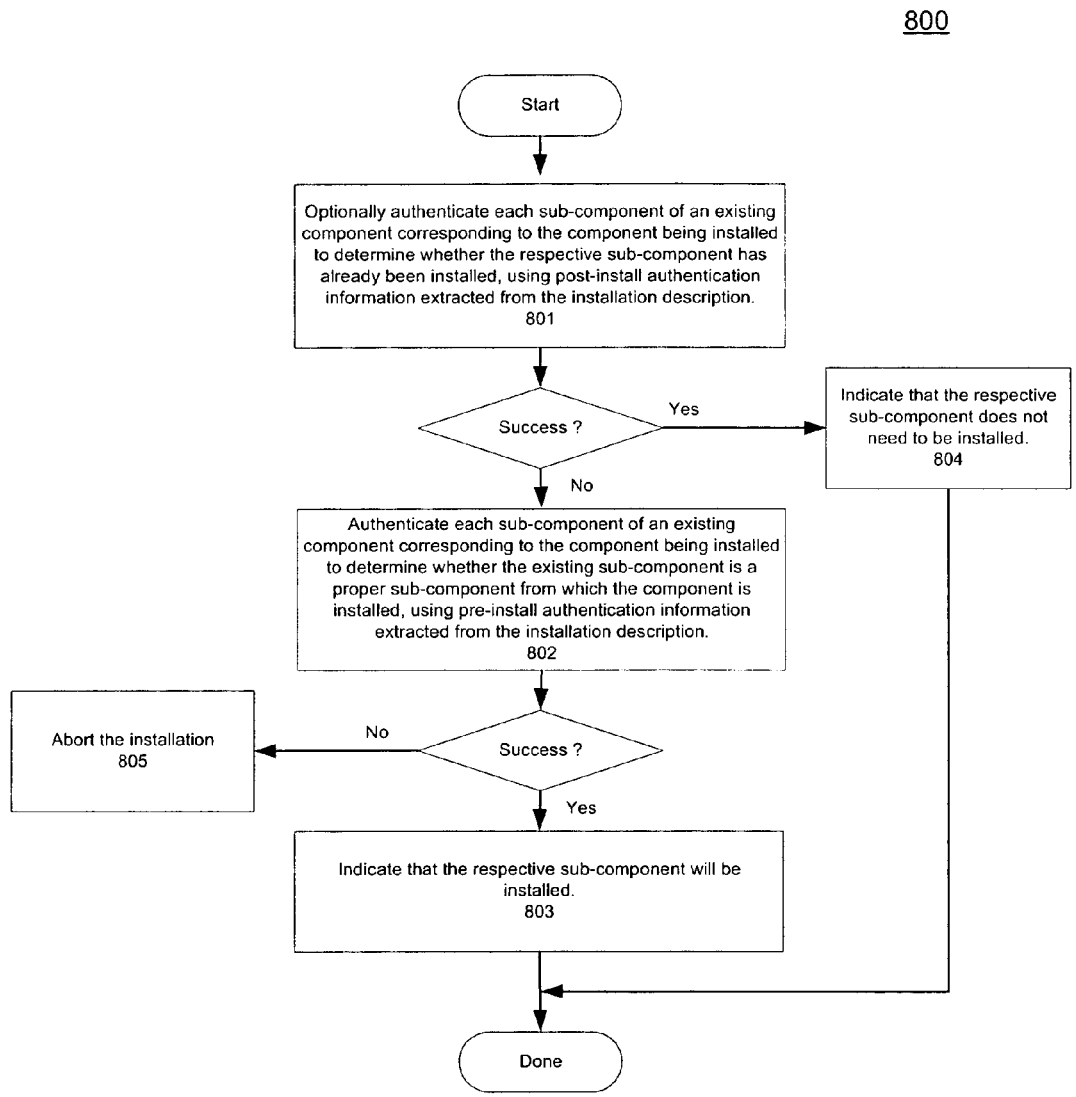
FIG. 8 is a flow diagram illustrating an exemplary process for installing a software package according to another embodiment of the invention.

FIG. 8 is a flow diagram illustrating an exemplary process for installing a software package according to one embodiment of the invention. Exemplary process 800 may be performed by a processing logic that may comprise hardware (circuitry, dedicated logic, etc.), software (such as is run on a dedicated machine), or a combination of both. For example, the exemplary process 800 may be performed as a part of operations involved in block 704 of FIG. 7. In a particular embodiment, exemplary process 800 may be performed on a non-versioned component.

Referring to FIG. 8, at block 801, the processing logic authenticates each sub-component of an existing component corresponding to the component being installed using a post-install authentication key extracted from the descriptor file to determine whether the component has already been installed. In one embodiment, the post-install authentication is performed optionally. Alternatively, the post-install version may be used to verify for the similar purposes.

If the post-install authentication is performed successfully, at block 804, it is indicated that the respective component does not need to be installed. In which case, the installation of the component will be skipped.

If the post-install authentication is performed unsuccessfully, at block 802, the processing logic authenticates each sub-component of an existing component using a pre-install authentication key extracted from the descriptor file to determine whether the existing component meets the pre-requirements of the installing the new component (e.g., whether the existing component is a baseline from which the new component is created).

If the pre-install authentication is performed successfully, at block 803, it is indicated that the respective component will be installed. Otherwise, at block 805, the installation of the software package will be aborted. Note that the pre-install and post-install authentication are not performed in a particular order. For example, the pre-install authentication may be performed prior to the post-install authentication. Other operations may also be performed.

Figure 9:
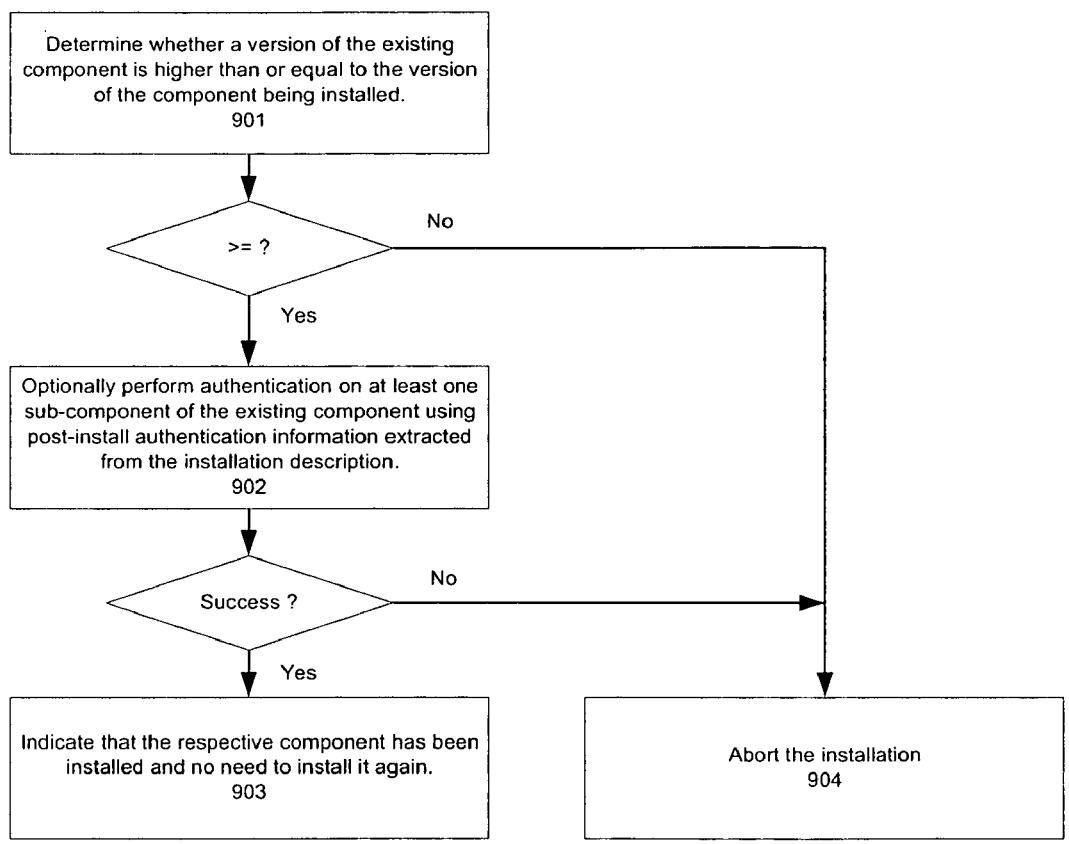
FIG. 9 is a flow diagram illustrating an exemplary process for installing a software package according to another embodiment of the invention.

FIG. 9 is a flow diagram illustrating an exemplary process for installing a software package according to one embodiment of the invention. Exemplary process 900 may be performed by a processing logic that may comprise hardware (circuitry, dedicated logic, etc.), software (such as is run on a dedicated machine), or a combination of both. For example, the exemplary process 900 may be performed as a part of operations involved in block 708 of FIG. 7.

Referring to FIG. 9, at block 901, the processing logic determines whether a version of the existing component is the same or newer than the version of the new component being installed. If the version of the existing component is the same or newer than the new one, at block 902, the processing logic may optionally authenticates an image of one or more sub-components of the existing component using a post-install authentication key extracted from the descriptor file.

If the post-install authentication is performed successfully, at block 903, it is indicated that the component has already been installed and its installation will be skipped. Otherwise, at block 904, the installation of the package may be aborted. Similarly, if the version of the existing component is older than the version of the new component being installed, at block 904, the installation may be aborted. Other operations may also be performed.

Figure 10:
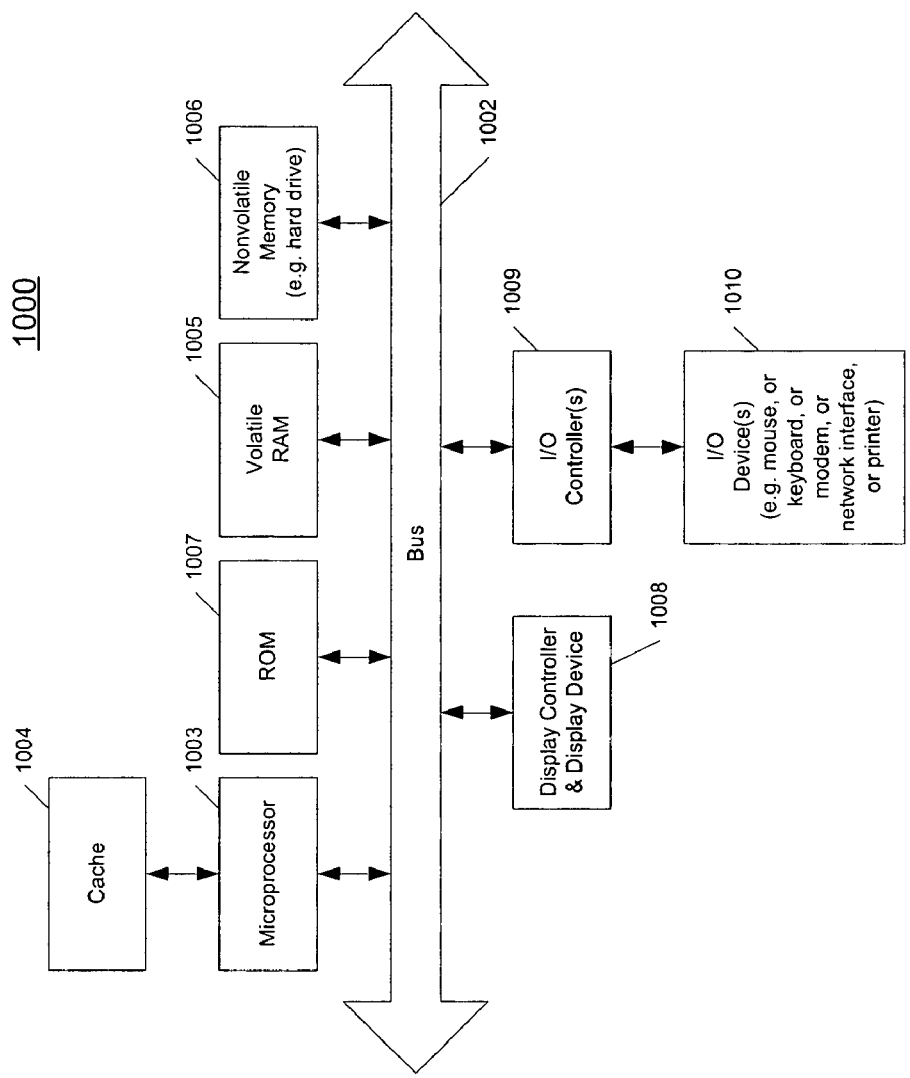
FIG. 10 is a block diagram of a digital processing system, which may be used with one embodiment of the invention.

FIG. 10 is a block diagram of a digital processing system, which may be used with one embodiment of the invention. For example, the system 1000 shown in FIG. 10 may be used as a client computer system such as client 101 of FIG. 1. Alternatively, the exemplary system 1000 may be implemented as a server 103 of FIG. 1.

Note that while FIG. 10 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 10 may, for example, be an Apple Macintosh computer or an IBM compatible PC.

As shown in FIG. 10, the computer system 1000, which is a form of a data processing system, includes a bus 1002 which is coupled to a microprocessor 1003 and a ROM 1007, a volatile RAM 1005, and a non-volatile memory 1006. The microprocessor 1003, which may be, for example, a PowerPC G4 or PowerPC G5 microprocessor from Motorola, Inc. or IBM, is coupled to cache memory 1004 as shown in the example of FIG. 10. The bus 1002 interconnects these various components together and also interconnects these components 1003, 1007, 1005, and 1006 to a display controller and display device 1008, as well as to input/output (I/O) devices 1010, which may be mice, keyboards, modems, network interfaces, printers, and other devices which are well-known in the art.

Typically, the input/output devices 1010 are coupled to the system through input/output controllers 1009. The volatile RAM 1005 is typically implemented as dynamic RAM (DRAM) which requires power continuously in order to refresh or maintain the data in the memory. The non-volatile memory 1006 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 10 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1002 may include one or more buses connected to each other through various bridges, controllers, and/or adapters, as is well-known in the art. In one embodiment, the I/O controller 1009 includes a USB (Universal Serial Bus) adapter for controlling USB peripherals. Alternatively, I/O controller 1009 may include an IEEE-1394 adapter, also known as FireWire adapter, for controlling FireWire devices.

Thus, mechanism for determining applicability of software packages for installation has been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for installing a software package, the method comprising:

retrieving authentication information from an installation descriptor file describing installation information of the software package, the software package having one or more components and each component having zero or more sub-components, the one or more components including a component having a first sub-component and a second sub-component, the authentication information including a verification setting for the component, the authentication information including a first authentication setting for the first sub-component, the authentication information including a second authentication setting for the second sub-component, the first authentication setting having a first plurality of keys, and the second authentication setting having a second plurality of keys including a pre-install key and a post-install key, the pre-install key to ensure a prerequisite for installing the software package is satisfied and the post-install key to determine whether a portion of the software package has already been installed;

verifying an existing component corresponding to the component according to the verification setting, wherein the existing component has already been installed;

selecting one of the first plurality of keys if the verification of the existing component is successful;

authenticating a first image of a first existing sub-component corresponding to the first sub-component using the selected key, wherein the first existing subcomponent has already been installed;

authenticating a second image of a second existing sub-component corresponding the second sub-component using more than one of the second plurality of keys including the pre-install key and the post-install key, wherein the authentication of the second image includes a first authentication and a second authentication, the first authentication being based on the pre-install key for ensuring the second existing sub-component satisfying the prerequisite for installing the software package, the second authentication being based on the post-install key for determining the second existing sub-component as the portion of the software package already installed, wherein the second existing sub-component has already been installed and wherein the authentication of the first image and the authentication of the second image being independent of each other;

indicating whether there is a need to install the first sub-component according to the authentication of the first image; and determining whether to install the first sub-component according to the authentication of the second image if the need to install the first sub-component is determined, wherein the first sub-component is installed if the first authentication fails and the second authentication succeeds.

2. The method of claim 1, wherein the installation descriptor file is an extensible markup language (XML) compatible file.

3. The method of claim 1, wherein the first plurality of keys includes a first key comprising a checksum value of the first sub-component of the existing component, and wherein the authentication of the first image comprises a checksum operation using the checksum value to authenticate the existing component.

4. The method of claim 1 further comprising installing the component based on the existing component according to the determination of the need to install the first sub-component.

5. The method of claim 4, wherein the verification setting includes a first predetermined version retrieved from the installation descriptor file, and wherein the verification of the existing component comprises comparing a version of the existing component with the first determined version.

6. The method of claim 5, wherein the one of the first plurality of keys is selected based on whether the version of the existing component matches the first predetermined version retrieved from the installation descriptor file.

7. The method of claim 5, wherein the verification setting includes a second predetermined version retrieved from the installation descriptor file, and wherein the verification of the existing component further comprising comparing the version of the existing component with the second predetermined version to determine whether the component has already been installed, if the version of the existing component does not match with the first predetermined version.

8. The method of claim 7, further comprising skipping installation of the component if the version of the existing component is greater than or equals to the second predetermined version retrieved from the installation descriptor file.

9. The method of claim 7, further comprising aborting the installation of the software package if the version of the existing component is less than the second predetermined version retrieved from the installation descriptor file.

10. The method of claim 4, wherein the verification of the first existing component further comprising determining whether the verification setting includes a version.

11. The method of claim 10, further comprising:
determining the existing component from installed components if the verification setting includes a version; and
aborting installation of the software package if the existing component corresponding to the component being installed does not exist.

12. The method of claim 10, wherein if the verification setting does not include a version, the method further comprises:
authenticating the first image of the first existing sub-component using at least one of the first plurality of keys, the at least one of the first plurality of keys being other than the selected key, to determine whether the component has already been installed, wherein no need to install the first sub-component is determined if the first image of the first existing sub-component is authenticated successfully using the at least one of the first plurality of keys other than the selected key.

13. The method of claim 1, further comprising:
authenticating the first image of the first existing sub-component using at least one of the first plurality of keys other than the selected key to determine whether the component can be installed based on the existing component;
installing the component if the authentication using the at least one of the first plurality of keys other than the selected key is performed successfully; and
aborting the installation of the software package if the authentication using the at least one of the first plurality of keys other than the selected key is performed unsuccessfully.

14. The method of claim 12, wherein the at least one of the first plurality of keys includes checksum values, and wherein the authentication using the at least one of the first plurality of keys includes a checksum operation using the checksum values.

15. A computer-readable storage medium having executable code to cause a machine to perform a method for installing a software package, the method comprising:
retrieving authentication information of a component from an installation descriptor file describing installation information of the software package, the software package having one or more components and each component having zero or more sub-components, the one or more components including a component having a first sub-component and a second sub-component, the authentication information including a verification setting for the component, the authentication information including a first authentication setting for the first sub-component, the authentication information including a second authentication setting for the second sub-component, the first authentication setting having a first plurality of keys, and the second authentication setting having a second plurality of keys including a pre-install key and a post-install key, the pre-install key to ensure a prerequisite for installing the software package is satisfied and the post-install key to determine whether a portion of the software package has already been installed;

verifying an existing component corresponding to the component according to the verification setting, wherein the existing component has already been installed;

selecting one of the first plurality of keys if the verification of the existing component is successful;

authenticating a first image of a first existing sub-component corresponding to the first sub-component using the selected key, wherein the first existing subcomponent has already been installed;

authenticating a second image of a second existing sub-component corresponding to the second sub-component using more than one of the second plurality of keys including the pre-install key and the post-install key, wherein the authentication of the second image includes a first authentication and a second authentication, the first authentication being based on the pre-install key for ensuring the second existing sub-component satisfying the prerequisite for installing the software package, the second authentication being based on the post-install key for determining the second existing sub-component as the portion of the software package already installed, wherein the second existing sub-component has already been installed and wherein the authentication of the first image and the authentication of the second image being independent of each other;

indicating whether there is a need to install the first sub-component according to the authentication of the first image; and determining whether to install the first sub-component according to the authentication of the second image if the need to install the first sub-component is determined, wherein the first sub-component is installed if the first authentication fails and the second authentication succeeds.

16. The computer-readable storage medium of claim 15, wherein the installation descriptor file is an extensible markup language (XML) compatible file.

17. The computer-readable storage medium of claim 15, wherein the first plurality of keys includes a first key comprising a checksum value of the first sub-component of the existing component, and wherein the authentication of the first image comprises a checksum operation using the checksum value to authenticate the existing component.

18. The computer-readable storage medium of claim 15, wherein the method further comprising installing the component based on the existing component according to the determination of the need to install the first sub-component.

19. The computer-readable storage medium of claim 18, wherein the verification setting includes a first predetermined version retrieved from the installation descriptor file, and wherein the verification of the existing component comprises comparing a version of the existing component with the first determined version.

20. The computer-readable storage medium of claim 19, wherein the one of the first plurality of keys is selected based on whether the version of the existing component matches the first predetermined version retrieved from the installation descriptor file.

21. The computer-readable storage medium of claim 19, wherein the verification setting includes a second predetermined version retrieved from the installation descriptor file, and wherein the verification of the existing component further comprises comparing the version of the existing component with the second predetermined version to determine whether the component has already been installed, if the version of the existing component does not match with the first predetermined version.

22. The computer-readable storage medium of claim 21, wherein the method further comprises skipping installation of the component if the version of the existing component is greater than or equals to the second predetermined version retrieved from the installation descriptor file.

23. The computer-readable storage medium of claim 21, wherein the method further comprises aborting the installation of the software package if the version of the existing component is less than the second predetermined version retrieved from the installation descriptor file.

24. The computer-readable storage medium of claim 18, wherein the verification of the first existing component further comprises determining whether the verification setting includes a version.

25. The computer-readable storage medium of claim 24, wherein the method further comprises:
    determining the existing component from installed components if the verification setting includes a version; and
    aborting installation of the software package if the existing component corresponding to the component being installed does not exist.

26. The computer-readable storage medium of claim 24, wherein if the verification setting does not include a version, the method further comprises:
    authenticating the first image of the first existing sub-component using at least one of the first plurality of keys, the at least one of the first plurality of keys being other than the selected key, to determine whether the sub-component has already been installed, wherein no need to install the first sub-component is determined if the first image of the first existing sub-component is authenticated successfully using the at least one of the first plurality of keys other than the selected key.

27. The computer-readable storage medium of claim 15, wherein the method further comprises:
    authenticating the first image of the first existing sub-component using at least one of the first plurality of keys other than the selected key to determine whether the sub-component can be installed based on the existing sub-component;
    installing the sub-component if the authentication using the at least one of the first plurality of keys other than the selected key is performed successfully; and
    aborting the installation of the software package if the authentication using the at least one of the first plurality of keys other than the selected key is performed unsuccessfully.

28. The computer-readable storage medium of claim 26, wherein the at least one of the first plurality of keys includes a checksum values, and wherein the authentication using the at least one of the first plurality of keys includes a checksum operation using the checksum values.

29. An apparatus for installing a software package, the apparatus comprising:

a storage to store an installation descriptor file to describe installation information of the software package, the software package including one or more components and each of the components having zero or more sub-components, the one or more components including a component having a first sub-component and a second sub-component, the authentication information including a verification setting for the first component, the authentication information including a first authentication setting for the first sub-component, the authentication information including a second authentication setting for the second sub-component, the first authentication setting having a first plurality of keys, and the second authentication setting having a second plurality of keys including a pre-install key and a post-install key, the pre-install key to ensure a prerequisite for installing the software package is satisfied and the post-install key to determine whether a portion of the software package has already been installed; and a processor coupled to the storage to execute an installer to retrieve the authentication information from the installation descriptor file, to verify an existing component corresponding to the component according to the verification setting, the existing component has already been installed, to select one of the first plurality of keys if the verification of the existing component is successful, to authenticate a first image of a first existing sub-component corresponding to the first sub-component using the selected key, the first existing subcomponent has already been installed, to authenticate a second image of a second existing sub-component corresponding to the second sub-component using more than one of the second plurality of keys including the pre-install key and the post-install key, wherein the authentication of the second image includes a first authentication and a second authentication, the first authentication being based on the pre-install key for ensuring the second existing sub-component satisfying the prerequisite for installing the software package, the second authentication being based on the post-install key for determining the second existing sub-component as the portion of the software package already installed, wherein the second existing sub-component has already been installed, to determine a need to install the first sub-component according to the authentication of the first image, and to determine whether to install the first sub-component according to the authentication of the second image if the need to install the first sub-component is determined, wherein the first sub-component is installed if the first authentication fails and the second authentication succeeds.

30. The apparatus of claim 29, wherein the installation descriptor file is an extensible markup language (XML) compatible file.

31. The apparatus of claim 29, wherein the first plurality of keys include a first key comprising a checksum value of the first sub-component of the existing component, and wherein the installer performs a checksum operation on the first image using the checksum value to authenticate the first image.

32. The apparatus of claim 29, wherein the installer installs the component based on the existing component according to the determination to install the first sub-component.

33. The apparatus of claim 32, wherein the installer further authenticates the first image of the first existing sub-component using at least one of the first plurality of keys other than the selected key to determine whether the component has already been installed, wherein the installer determines no need to install the first sub-component if the first image of the first existing sub-component is authenticated successfully using the at least one of the first plurality of keys other than the selected key and wherein the installer skips the installation of the component if the authentication using the at least one of the first plurality of keys other than the selected key is performed successfully.

34. The apparatus of claim 32, wherein the installation descriptor file is downloaded from a server over a network without downloading the actual software package, and wherein the software package is downloaded from the server only if the authentication using the first key is performed successfully by the installer.

35. A hardware apparatus for installing a software package, the apparatus comprising:

means for retrieving authentication information from an installation descriptor file describing installation information of the software package, the software package having one or more components and each component having zero or more sub-components, the one or more components including a component having a first sub-component and a second sub-component, the authentication information including a verification setting for the first component, the authentication information including a first authentication setting for the first sub-component, the authentication information including a second authentication setting for the second sub-component, the first authentication setting having a first plurality of keys, and the second authentication setting having a second plurality of keys, including a pre-install key and a post-install key, the pre-install key to ensure a prerequisite for installing the software package is satisfied and the post-install key to determine whether a portion of the software package has already been installed;

means for verifying an existing component corresponding to the component according to the verification setting, wherein the existing component has already been installed;

means for selecting one of the first plurality of keys if the verification of the existing component is successful;

means for authenticating a first image of a first existing sub-component corresponding to the first sub-component using the selected key, the first existing subcomponent has already been installed;

means for authenticating a second image of a second existing sub-component corresponding to the second sub-component using more than one of the second plurality of keys including the pre-install key and the post-install key, wherein the authentication of the second image includes first authentication and a second authentication, the first authentication being based on the pre-install key for ensuring the second existing sub-component satisfying the prerequisite for installing the software package, the second authentication being based on the post-install key for determining the second existing sub-component as the portion of the software package already installed, the second existing sub-component has already been installed and wherein the authentication of the first image and the authentication of the second image being independent of each other;

means for determining a need to install the first sub-component according to the authentication of the first image; and means for determining whether to install the first sub-component according to the authentication of the second image if the need to install the first sub-component is determined, wherein the first sub-component is installed if the first authentication fails and the second authentication succeeds.

36. A data processing system, comprising:
a processor; and
a memory coupled to the processor having instructions that, when executed from the memory, cause the processor to perform operations including,
retrieving authentication information from an installation descriptor file describing installation information of the software package, the software package having one or more components and each component having zero or more sub-components, the one or more components including a component having a first sub-component and a second sub-component, the authentication information including a verification setting for the first component, the authentication information including a first authentication setting for the first sub-component, the authentication information including a second authentication setting for the second sub-component, the first authentication setting having a first plurality of keys, and the second authentication setting having a second plurality of keys including a pre-install key and a post-install key, the pre-install key to ensure a prerequisite for installing the software package is satisfied and the post-install key to determine whether a portion of the software package has already been installed;
verifying an existing component corresponding to the component according to the verification setting, the existing component has already been installed;
selecting one of the first plurality of keys if the verification of the existing component is successful;
authenticating an first image of a first existing sub-component corresponding to the first sub-component using the selected key, the first existing subcomponent has already been installed;
authenticating a second image of a second existing sub-component corresponding to the second sub-component using more than one of the second plurality of keys including the pre-install key and the post-install key, wherein the authentication of the second image includes a first authentication and a second authentication, the first authentication being based on the pre-install key for ensuring the second existing sub-component satisfying the prerequisite for installing the software package, the second authentication being based on the post-install key for determining the second existing sub-component as the portion of the software package already installed, the second existing sub-component has already been installed and wherein the authentication of the first image and the authentication of the second image being independent of each other;
determining a need to install the first sub-component according to the authentication of the first image; and
determining whether to install the first sub-component according to the authentication of the second image if the need to install the first sub-component is determined, wherein the first sub-component is installed if the first authentication fails and the second authentication succeeds.

37. A method for installing a software package, the method comprising:

downloading from a server over a network a package metadata (PKM) file describing installation of the software package without downloading the software package, the package meta data file including authentication information for the installation, the software package including one or more components and each of the components having zero or more sub-components, the one or more components including a component having a first sub-component and a second sub-component, the authentication information including a verification setting for the first component, the authentication information including a first authentication setting for the first sub-component, the authentication information including a second authentication setting for the second sub-component, the first authentication setting having a first plurality of keys, and the second authentication setting having a second plurality of keys including a pre-install key and a post-install key, the pre-install key to ensure a prerequisite for installing the software package is satisfied and the post-install key to determine whether a portion of the software package has already been installed;
verifying an existing component corresponding to the component according to the verification setting, the existing component has already been installed;
selecting one of the first plurality of keys if the verification of the existing component is successful;
authenticating a first image of a first existing sub-component corresponding to the first sub-component using the selected key, the first existing subcomponent has already been installed;
authenticating a second image of a second existing sub-component corresponding to the second sub-component using more than one of the second plurality of keys including the pre-install key and the post-install key, wherein the authentication of the second image includes a first authentication and a second authentication, the first authentication being based on the pre-install key for ensuing the second existing sub-component satisfying the prerequisite for installing the software package, the second authentication being based on the post-install key for determining the second existing sub-component as the portion of the software package already installed, the second existing sub-component has already been installed and wherein the authentication of the first image and the authentication of the second image being independent of each other;
determining a need to install the first sub-component according to the authentication of the first image;
determining whether to install the first sub-component according to the authentication of the second image if the need to install the first sub-component is determined, wherein the first sub-component is installed if the first authentication fails and the second authentication succeeds; and
downloading at least a portion of the software package from the server to be installed if the first image of the first existing sub-component is authenticated successfully using the selected key retrieved from the PKM file.

38. The method of claim 37, wherein the PKM file is an extensible markup language (XML) compatible file.

39. The method of claim 37, wherein the first plurality of keys include a first key comprising a checksum value of the first sub-component of the existing component, and wherein the authentication of the first image includes a checksum operation using the checksum value to authenticate the existing component.

* * * * *